United States Patent [19]
Wan et al.

[11] Patent Number: 5,263,053
[45] Date of Patent: Nov. 16, 1993

[54] FRACTIONALLY SPACED MAXIMUM LIKELIHOOD SEQUENCE ESTIMATION RECEIVER

[75] Inventors: Yongbing Wan; Qingli Liu; Andrew Sendyk, all of Calgary, Canada

[73] Assignee: NovAtel Communications Ltd., Calgary, Canada

[21] Appl. No.: 856,526

[22] Filed: Mar. 24, 1992

[51] Int. Cl.$^5$ .............................. H04B 15/00
[52] U.S. Cl. ........................ 375/58; 375/60; 375/94
[58] Field of Search ............... 375/38, 39, 42, 58, 375/67, 94, 99, 60; 371/43, 44, 45; 341/51, 81; 329/304

[56] References Cited

U.S. PATENT DOCUMENTS

| | | | |
|---|---|---|---|
| 4,504,872 | 3/1985 | Petersen | 260/40 |
| 4,885,757 | 12/1989 | Provence | 375/94 |
| 4,947,408 | 8/1990 | Sadr et al. | 375/94 |
| 5,146,475 | 9/1992 | Kubo | 371/43 |
| 5,155,744 | 10/1992 | Ringelhaan | 375/9 X |

FOREIGN PATENT DOCUMENTS

0434040A2 6/1991 European Pat. Off. .

OTHER PUBLICATIONS

"Maximum-Likelihood Sequence Estimation of Digital Sequences in the Presence of Intersymbol Interference," *IEEE Transactions on Information Theory*, vol. IT-18, No. 3, May 1972, by G. David Forney, Jr.

"The Viterbi Algorithm," *Proceedings of the IEEE*, vol. 61, No. 3, Mar., 1973, by G. David Forney, Jr.

"Adaptive Maximum-Likelihood Sequence Estimation for Digital Signaling in the Presence of Intersymbol Interference," *IEEE Transactions on Information Theory*, Jan., 1973, by Francis R. Magee, Jr. and John G. Proakis.

"Adaptive Maximum-Likelihood Receiver for Carrier-Modulated Data-Transmission Systems," *IEEE Transactions on Communications*, vol. Com-22, No. 5, May, 1974, by Gottfried Ungerboeck.

"An Adaptive MLSE Receiver for TDMA Digital Mobile Radio," *IEEE Journal on Selected Areas in Communications*, vol. 7, No. 1, Jan., 1989, by Renato D'Avela, Luigi Moreno and Marcello Sant'Agostino.

"Adaptive Equalization," *Proceedings of the IEEE*, vol. 73, No. 9, Sep., 1985, by Shahid U. H. Qureshi.

*Primary Examiner*—Stephen Chin
*Attorney, Agent, or Firm*—Cesari and McKenna

[57] ABSTRACT

The channel-impulse-response estimator (44') in a maximum-likelihood-sequence-estimation receiver produces channel-model parameters for a model that produces outputs not only for symbol times but also for intermediate times between the symbol times. A symbol-sequence-derivation circuit (42') determines the most-likely sequence on the basis of metrics computed from the differences between the received signal and the responses of the model to candidate sequences not only at the symbol times but also at the intermediate times. An interpolator (100) receives the symbol decisions from the symbol-sequence-derivation circuit (42') and generates intermediate values from them by simulating the Nyquist filter formed by the concatenation of pulse-shaping filters (22 and 24) in the transmitter and matched filters (36 and 37) in the receiver. The channel-impulse-response estimator (44') uses these values together with the derived-symbol values as inputs to its updating process to maintain the model.

27 Claims, 8 Drawing Sheets

FRACTIONALLY SPACED MAXIMUM LIKELIHOOD SEQUENCE ESTIMATION RECEIVER

BACKGROUND OF THE INVENTION

The present invention is directed to digital signal receivers and in particular to receivers that employ maximum-likelihood-sequence estimation.

Maximum-likelihood-sequence estimation (MLSE) is a method widely employed to extract, from corrupted signals, the symbols that the signals had been intended to carry. The principle of the MLSE algorithm—on which the present invention is based—was described in Forney, "Maximum-Likelihood Sequence Estimation of Digital Sequences in the Presence of Intersymbol Interference," *IEEE Trans. Infor. Theory*, vol. IT-18, May 1972. For purposes of exposition, however, we will describe an embodiment in connection with a particular application, namely, $\pi/4$-shifted differential-quadrature phase-shift-keying ($\pi/4$-DQPSK) transmission, which has been proposed for digital transmission using cellular telephones.

Figure 1:
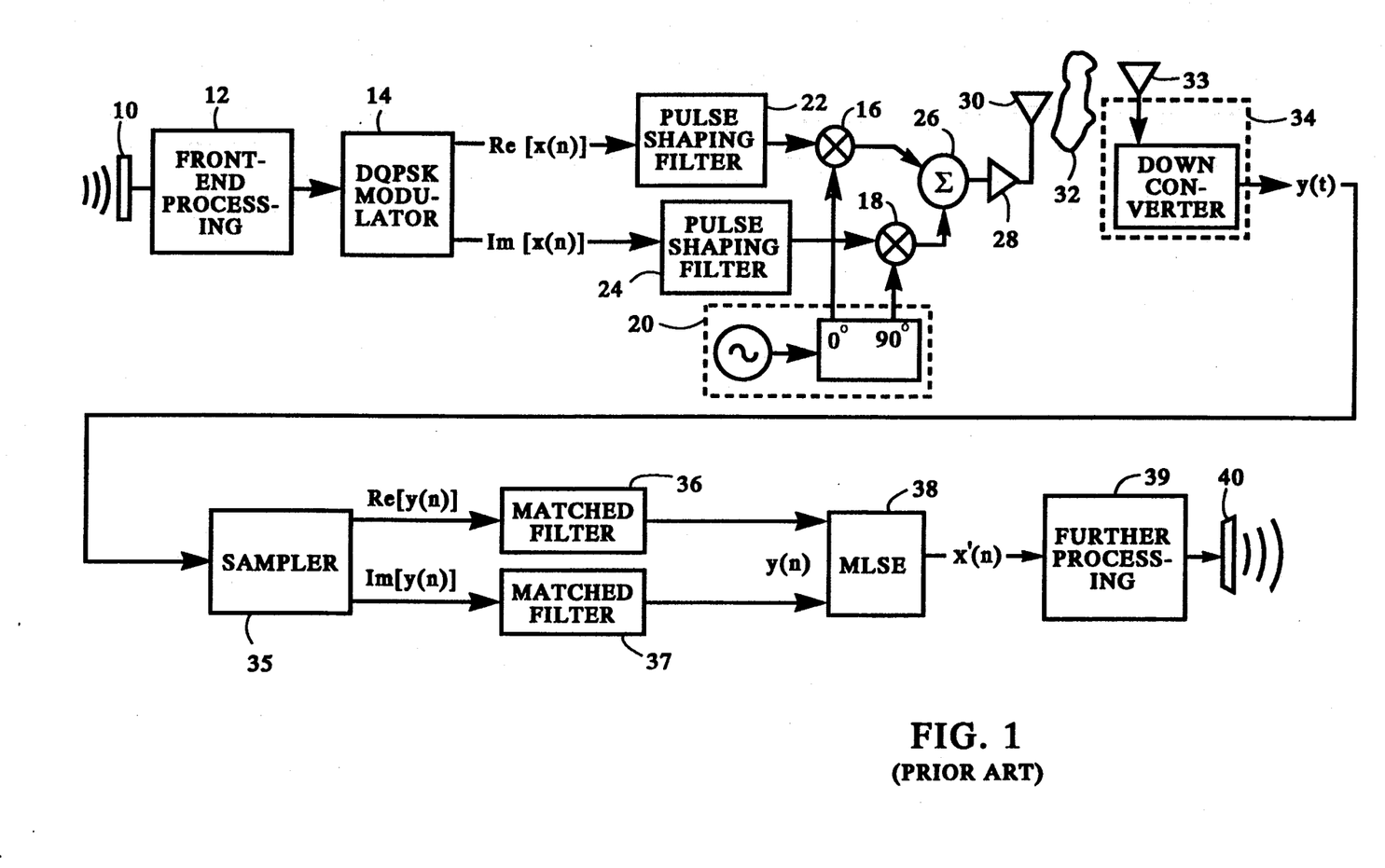
FIG. 1, previously described, is a block diagram of a communications system of the type to which the present invention can be applied.
Figure 2:
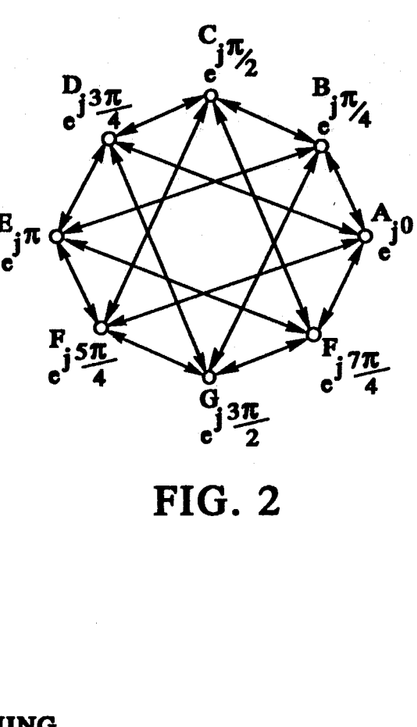
FIG. 2, previously described, is a constellation diagram of the symbols used in the communications system of FIG. 1.

In such an arrangement, an audio signal picked up by a microphone 10 is applied to transmitter front-end circuitry 12, which digitizes the analog signal, performs various levels of encoding and framing of the resultant raw digitized signal, and produces a resultant output as a stream of bits. A $\pi/4$-DQPSK modulator 14 receives the resultant sequence two bits at a time and responds to each bit pair by generating a two-component output signal x(n), which specifies one of eight points equally spaced about a circle in the complex plane, the phase of each point representing a different phase with respect to a carrier. Each of the four possible two-bit combinations results in a different one of the four possible shifts from the previous phase: $\pm\pi/4$ and $\pm3\pi/4$. Accordingly, the $\pi/4$-DQPSK-modulator output depends not only on its current two-bit input but also on its previous output, as the constellation diagram of FIG. 2 shows.

That diagram shows that, if the symbol generated at a given time represents, say, a phase angle of zero, the subsequent symbol can represent only an odd multiple of $\pi/4$. The same is true of all of the even multiples of $\pi/4$. If the phase that results from one bit pair in the bit stream point is an even multiple of $\pi/4$, therefore, the phase that results from the bit pair that follows it will be an odd multiple thereof, and vice versa.

As FIG. 1 shows, modulators 16 and 18 amplitude modulate in-phase and quadrature components, respectively, of a carrier that a source 20 generates. However, if the raw output of the $\pi/4$-shifted-DQPSK modulator 14 were applied directly to the amplitude modulators 16 and 18, the abrupt phase changes would cause the spectrum of the resultant signal to be much wider than is allowed for single-channel cellular-telephone transmission. Digital filters 22 and 24 therefore subject the two DQPSK-modulator outputs to low-pass filtering before the resultant signals are used to modulate the two carrier components. An analog adder 26 then sums the outputs of modulators 16 and 18 to produce a DQPSK signal, which an amplifier 28 boosts in power before transmitting it by way of an antenna 30.

The antenna may be thought of as delivering the signal to the relatively uncontrollable, time-varying part 32 of the signal channel. This part of the channel usually includes multiple different-length paths from the transmitter to the receiver, and these paths typically fade and change as the transmitter and/or receiver moves about.

At the receiver end, an antenna 33 picks up the signal and applies it to a down-converter 34, which extracts the in-phase and quadrature components and generates a two-component baseband output signal y(t). A sampler 35 samples the (complex-valued) signal y(t) to produce a sequence of samples, each of which may, for instance, take the form of two eight-bit components respectively representing the relative amplitudes of the in-phase and quadrature components.

Matched filters 36 and 37 respectively filter the in-phase and quadrature components of y(t). In the preferred embodiment the responses of filters 36 and 37 are the same as those of pulse-shaping filters 22 and 24, and the concatenation of each pulse-shaping filter with its corresponding matched filter forms a respective Nyquist filter, i.e., a filter whose impulse response goes through zero at $t=nT$, $n=1,2,\ldots$, where T, the symbol period, is 41.2 $\mu$sec in the North American digital cellular system. In the absence of channel segment 32, therefore, the output of the Nyquist filter at nT would exhibit no intersymbol-interference (ISI) distortion. However, due to the multipath characteristic of the radio-channel part 32 and receiver noise, ISI distortion and noise corruption do occur. To combat distortion and extract the desired information, therefore, an MLSE circuit 38 processes y(n) to arrive at an estimate x'(n) of the symbols x(n) originally produced. Further processing 39 then typically decodes this symbol train and performs other functions before producing the ultimate signal applied, say, to a handset receiver 40.

Figure 3:
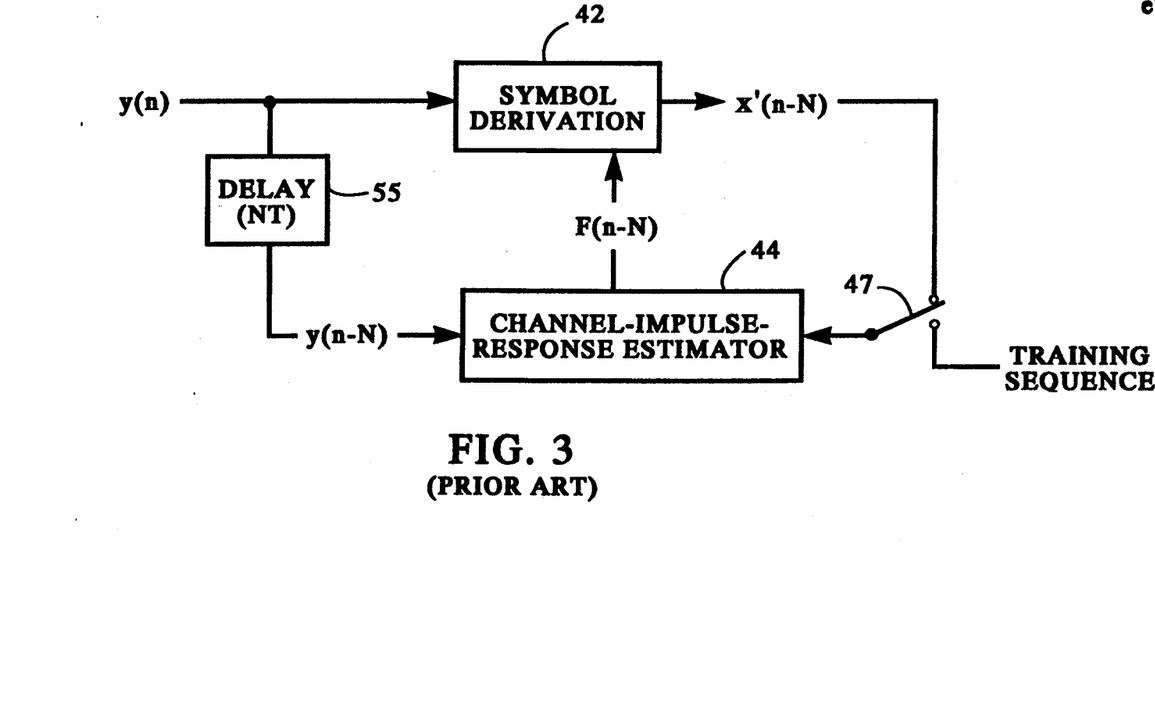
FIG. 3, previously described, is a block diagram of a maximum-likelihood-sequence estimator.

FIG. 3 is a block diagram of the maximum-likelihood sequence estimator 38. A symbol-sequence-derivation circuit 42 receives a (filtered) sample sequence y(n) from the matched filters and determines, typically by employing the Viterbi algorithm in a manner that will be described shortly, the sequence of symbols x'(n) most likely to have resulted in the sample sequence y(n) that the MLSE circuitry receives from the receiver's front-end circuitry. FIG. 3 shows the resultant symbol sequence as x'(n-N) to reflect the processing delay of N symbol periods between reception of a sample y(n) and generation of the corresponding derived symbol x'(n).

To derive these symbols x'(n-N), the symbol-sequence-derivation circuit 42 requires parameters that characterize the time-varying channel segment 32. The determination of these parameters is the task of the channel-impulse-response estimator 44, which includes a transversal filter 46 depicted in FIG. 4. Filter 46 models channel segment 32, or, more precisely, models the effect that the time-varying channel segment 32 has as a constituent of the larger channel that extends from the DQPSK modulator output port to the output ports of the matched filters 36 and 37. The derived symbols x'(n-N) are assumed, for the purposes of estimator 44, to be precisely the symbols that the DQPSK modulator initially produced: they were the actual inputs to the channel whose departures from the ideal the filter 46 is intended to model. In many practical systems, the operation may be initialized with application of a sequence known to be sent during initialization, as switch 47 of FIG. 3 suggests. Indeed, in certain systems in which certain predetermined "header" sequences are transmitted on a regular basis, the model may be updated only during the header sequence, and the predetermined training sequence is used as the estimator's only reference sequence, to the exclusion of the derived symbols. In such an arrangement, of course, the model is updated only during header transmission.

Figure 4:
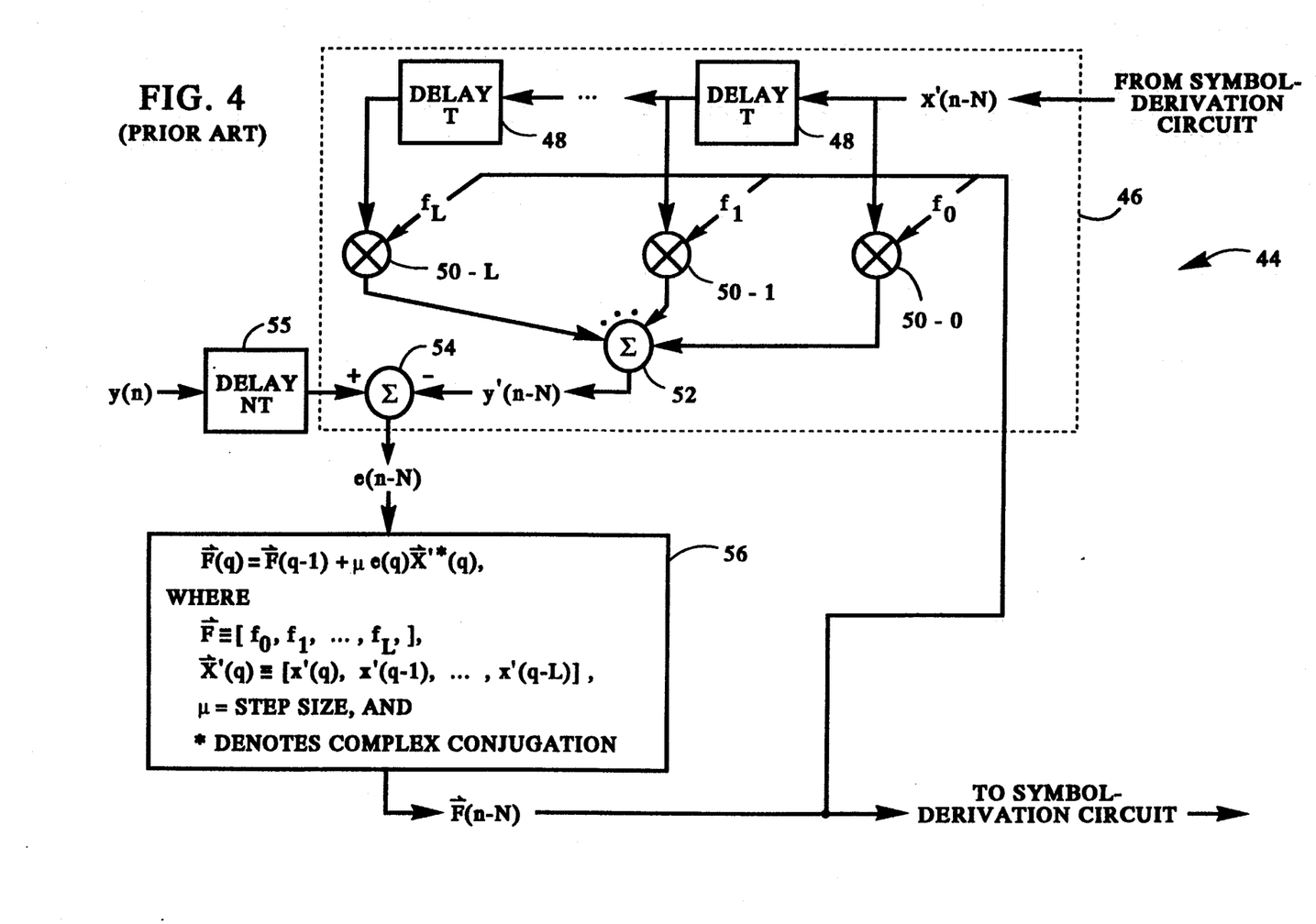
FIG. 4, previously described, is a block diagram of the channel-impulse-response estimator employed in the MLSE circuit of FIG. 3.

The filter 46 includes a number of delay elements 48, each of which imposes a delay equal to one symbol period T. Respective multipliers 50 multiply the delay-element contents by respective coefficients $f_0, f_1, \ldots, f_L$, which will collectively be referred to as a vector F of channel-model parameters. A summing circuit 52 adds the results together to generate the filter output $y'(n-N)$, which is the result of applying the original symbols to the channel model.

A subtraction circuit 54 subtracts this model output $y'(n-N)$ from an N-delayed version $y(n-N)$ of the actual channel output that a delay circuit 55 generates, and the difference is the error $e(n-N)$ in the model output. An update circuit 56 uses this error to adjust the values of the channel-model parameters F in accordance with one of the known error-reducing methods. The equation depicted in block 56 represents the least-mean-square adaptation algorithm, although many others, such as the recursive-least-square algorithm, could be employed instead.

In short, a new set $F(n-N)$ of channel parameters is calculated at each symbol time n, and each updated version of the channel parameters $F(n-N-1)$ is employed, in a manner that will now be described, to incorporate a new sample $y(n)$ into the derivation of the sequence of derived symbols $x'(n)$.

In principle, the general approach is to apply, to the model characterized by channel parameters F, all permissible sequences $x''(n)$ that the DQPSK modulator 14 could have generated and to determine which one of the resultant trial output sequences $y''(n)$ is "closest" by some measure to the observed actual sample train $y(n)$.

Figure 5A:
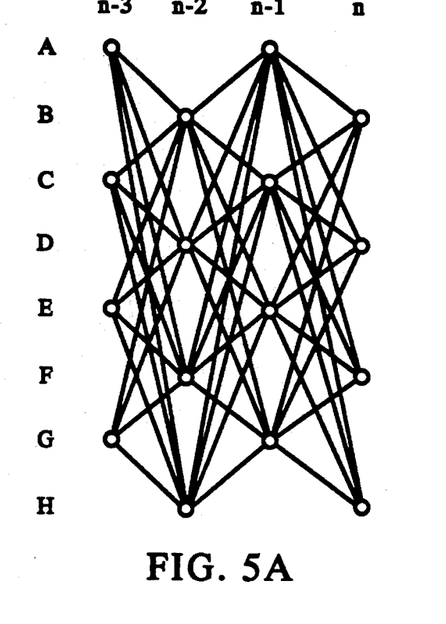
FIGS. 5A–D, previously described, are trellis diagrams used above to explain the operation of the Viterbi algorithm that one type of MLSE circuit employs.

In practice, this determination is ordinarily performed by means of the Viterbi algorithm, which is conventionally illustrated by a trellis diagram such as FIG. 5A. The trellis diagram of FIG. 5A includes an array of nodes, each of which represents the "state" of channel segment 32 at a given symbol time. More specifically, each row represents a different "state," while each column represents a different symbol time.

The state of a channel can be thought of as representing the last L symbols that have been applied to it at any particular time, where the channel's memory length is L symbol periods. As those skilled in the art will recognize, the only input upon which the output of a memoryless channel depends is the current one. For a channel that has memory, as channel segment 32 is assumed to have, the output depends not only on the current symbol but on the sequence of L previous symbols.

Each row in FIG. 5A therefore represents a different permissible sequence of L symbols and, equivalently, a different state into which a corresponding sequence of L symbols would have placed the channel segment 32. Moreover, each line ("branch") leading to the right from a given node in one column to a different node in the next column represents a different one of the permissible symbols applied to the channel in the state that the given node represents. In a trellis diagram that represents all possible sequences of states, therefore, the number of branches leading to the right from any given node is equal to the number of permissible symbols at the corresponding symbol time.

Figure 5B:
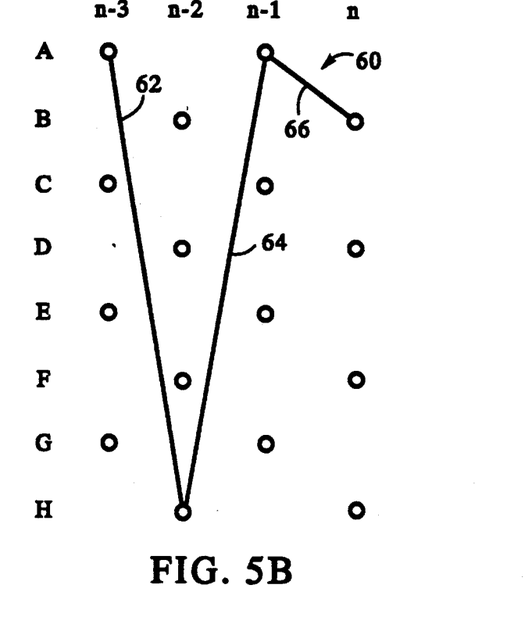

Additionally, each left-to-right path through the trellis represents a sequence of states and thus a sequence of code symbols. For instance, path 60 of FIG. 5B represents the code-symbol-sequence AHAB, while each of the path's constituent branches 62, 64, and 66 represents a symbol.

Now, in the particular trellis diagram of FIG. 5A, it is assumed that L=1, so the number of states is equal only to the number of permissible symbols at any symbol time. Moreover, since the trellis diagram of FIG. 5A represents the $\pi/4$-shifted-DPSK coding scheme assumed here, there are only four nodes in each column, one for each permissible symbol. Again because L=1 and the number of states in each column is thus equal to the number of permissible symbols at the corresponding symbol time, each node in a given column—that is, each state—can be reached from any node/state in the previous column.

As was stated above, the purpose of an MLSE scheme is to find, among all permissible sequences, the one most likely to have resulted in the input sample train of $y(n)$'s that was actually observed. Determination of the various sequences' probabilities is based on the assumption that the model produced by the channel-impulse-response estimator 44 is exact but that the $y(n)$'s result from the addition of Gaussian noise to that model's output.

Under this assumption, the probability that a given sample $y(n)$ resulted from a given sequence is a function of the difference between that sample $y(n)$ and the output $y''(n)$ that the model produces when that sequence is applied to it as an input. That is, the probability density is proportional to $\exp[-(\frac{1}{2})|y-y''|^2/\sigma^2]$, where $\sigma$ is the standard deviation of the noise distribution. If this quantity is computed for each symbol in a candidate sequence, then the product of those quantities is proportional to the likelihood that the candidate sequence was the one applied to the pulse-shaping filters 22 and 24 to result in the sequence of samples $y(n)$ that was actually observed.

The computational complexity of computing the likelihood is reduced by replacing multiplications of the probability density with additions of quantities proportional to their logarithms. That is, a "branch metric" proportional to $|y-y''|^2$ is computed for each symbol in the sequence (or, as it is more commonly described in this context, for each state transition in the sequence), and the branch metrics for all of the state transitions of a sequence are added together. Clearly, the sequence whose path metric—i.e., whose sum of constituent branch metrics—is the lowest is the one with the maximum likelihood.

By (again, in principle) comparing those path metrics for all permissible sequences, the MLSE scheme determines the sequence most likely to have been sent. However, rather than computing, for a sequence of M received samples $y(n)$, the path metrics for all of the $4^M$ permissible sequences that could have caused it, the Viterbi algorithm obtains essentially the same result with much fewer calculations, as we will now demonstrate.

We join the operation of the Viterbi algorithm at time n, when a new sample $y(n)$ has just been taken. At this point, it is known only that the symbol sent at time n is one of the legal symbols B, D, F, and H, but no decision has been made concerning which of the four it was. Indeed, the algorithm has not yet determined which of the legal symbols A, C, E, and G was sent at the previous symbol time n-1. In a manner that will shortly be described, however, the algorithm has determined, for each of the state-representing nodes in column n-1, the path by which that node was reached if it does represent the state that actually prevailed at time n-1.

Figure 5C:
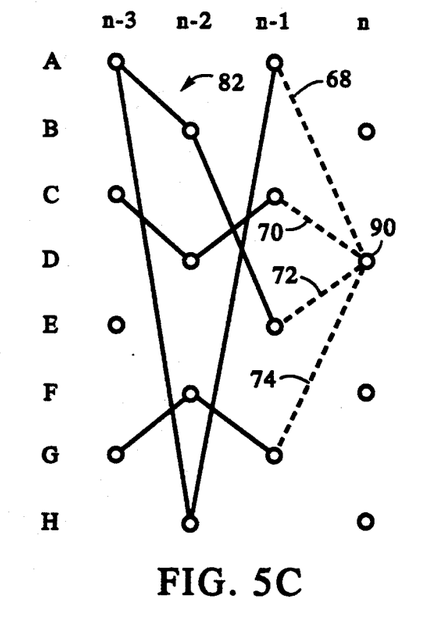

FIG. 5C depicts the paths respectively associated with the four nodes in column n-1; i.e., it omits the FIG. 5A branches that do not belong to any of those paths. When incoming sample y(n) is initially taken, the Viterbi algorithm has not yet determined which path corresponds to each of the nodes in column n. In the illustrated system, therefore, sixteen candidate paths are still possible at that time—that is, each of the four legal states at time n could have been preceded by any of the four states that were legal at time n-1. For the state resulting from transmission of symbol D, for instance, the four paths respectively including branches 68, 70, 72, and 74 all represent candidates for the sequence that ended in that state at time n.

Figure 6:
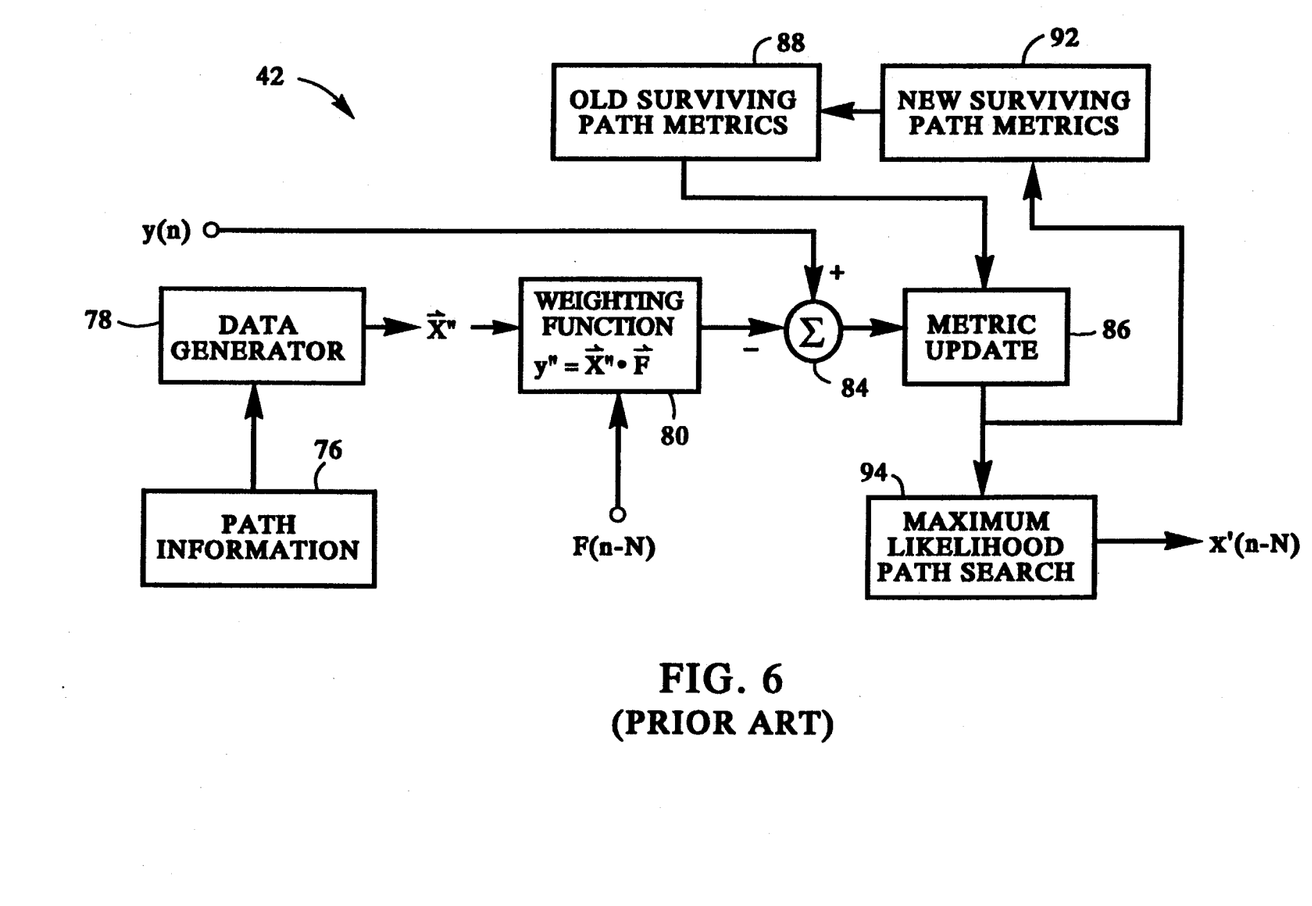
FIG. 6, previously described, is a block diagram of the symbol-sequence-derivation circuit employed by the MLSE circuit of FIG. 3.

To determine which of these paths to assign to each state at time n, the receiver employs an apparatus of the type depicted in FIG. 6. (As those skilled in the art will recognize, FIG. 6 is a functional diagram, in which the blocks represent different functions that may actually be provided by common circuitry, such as a common digital signal processor or microprocessor and related memory.) A path-information memory 76 contains information concerning which symbol sequences are legal. From this information, a data generator 78 generates and applies to a weighting-function circuit 80 series of vectors X'' representing the different candidate paths.

One vector, for instance, would represent two states on path 82 of FIG. 5C. It would thus be [exp(j$\pi$), exp(j3$\pi$/4)], i.e., the values of the (one-symbol) sequence E that defines that path's state at time n-1 and of the symbol D hypothetically transmitted. The weighting-function step 80 computes the scalar product of this vector and the channel parameters F and thereby determines the value y''(n) that the actual sampled value y(n) would have had if the sequence represented by path 82 had actually been transmitted, the current channel parameters F modeled the channel precisely, and no noise had been present.

A subtraction circuit 84 computes the difference between this value and the actually sampled value y(n). A metric-update element 86 computes from this difference the branch metric associated with branch 72 (the last branch in path 82), typically by squaring its magnitude, and it adds the result to an old path metric retrieved from an old-surviving-path-metric memory 88. The old path metric had been computed in previous iterations by adding up the branch metrics of path 82's other constituent branches.

The path metrics for all of the other branches that lead to node 90 (FIG. 5C) are similarly computed, and the metric-update circuit 86 determines which of these path metrics is the lowest. The path thus identified is then considered to represent the symbol sequence that is most likely to have been transmitted if the last state is the one that node 90 represents. This path is denoted a "surviving path," and its metric is stored in new-surviving-path-metric memory 92.

Figure 5D:
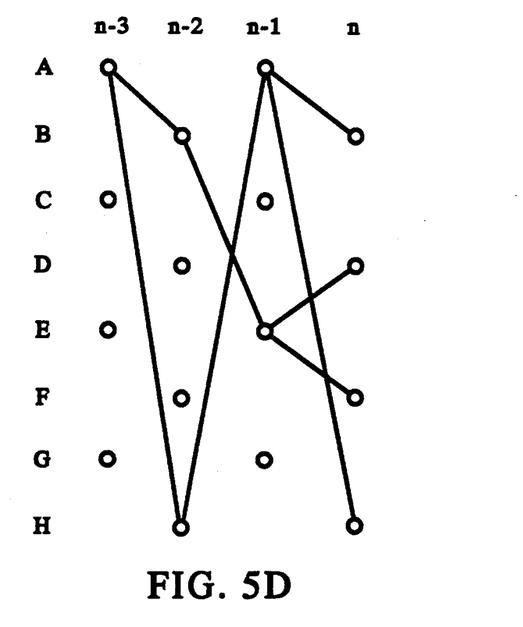

The same procedure is followed for each of the other nodes in column D, and the contents of memory 92 are then transferred to memory 88 for the next iteration. FIG. 5D depicts a typical result.

The path-metric results can be employed in a number of ways to arrive at the derived symbol sequence. Assume, for instance, that time n is the end of transmission and that the symbol sequence does not need to be known until that time. In such a situation, the four path metrics for the paths ending at each node in column n are compared, and the derived symbol-sequence output is simply that which corresponds to the path having the lowest path metric.

Even if the ultimate user does not need the sequence until the end of transmission, however, derived symbols may be needed earlier than that to update the channel model. In such a situation, "tentative" decisions of the symbol sequences may be made earlier and applied to the channel-impulse-response estimator 44 so as to keep the channel model current. This may result in an input sequence to the channel-impulse-response estimator that differs slightly from the output presented to the user.

It may also happen that part of the maximum-likelihood sequence will be apparent before the end of the transmission. In FIG. 5D, for instance, it is clear that, regardless of which path ultimately turns out to represent the maximum-likelihood sequence, it will include the path by which state A was reached at time n-3. Thus, some of the symbols in the maximum-likelihood sequence, as computed at the end of transmission, can be known and presented to the user before transmission ends.

In most situations, of course, the user will need some output before transmission ends, and the output in those situations is what would otherwise be a tentative sequence.

This MLSE method is a powerful tool for extracting transmitted symbols from a signal that has been distorted by the channel through which it has propagated and corrupted by noise, and it has accordingly found favor as a way of dealing with the difficulties that are encountered in some communications systems. The requirements presented by time-division multiplexing in narrow-band cellular-telephone channels are quite severe, however, and an improvement over the performance that results even from conventional MLSE techniques would be welcome.

SUMMARY OF THE INVENTION

We have found that a reduction in the bit-error rates resulting from multipath fading channels of the type typically encountered in North American cellular-telephone environments can be achieved by what we refer to as "fractionally spaced" MLSE.

The symbol-derivation circuit in such a receiver calculates its metrics by means of a model that uses not only the candidate symbols as inputs but also intermediate values, which represent channel "inputs" between symbol times. These may be determined, for instance, by using the equivalent of the Nyquist filter to interpolate between the symbols in the candidate sequence, and the model would include parameters that correspond to these intermediate times. This makes the modeling more "fine-grained" and thus more accurate.

Preferably, the symbol-sequence-derivation circuit not only uses such intermediate-value inputs to its model but also takes advantage of the model's intermediate-value outputs by comparing them with intermediate samples from the front-end circuit and combining the results to compute the branch metrics. This, of course, requires that the front-end circuit take samples not only at symbol times but also at intermediate times.

One way to produce the intermediate channel parameters is for the channel-impulse-response estimator to update the channel parameters by comparing these intermediate samples with the model response to the reference values. Alternately or in addition, the channel-impulse-response estimator's reference values can include, say, values interpolated between the derived symbols or the symbols of the training sequence.

Simulations have shown that the resultant bit-error rates can be reduced to a fraction of those that would result from conventional, symbol-spaced MLSE. This is because channel models in conventional, symbol-spaced MLSE cannot accurately characterize the channel when the delay spread is comparable to or only a fraction of a symbol period. Moreover, they cannot use intermediate-sample information from the channel, as certain embodiments of our invention do.

BRIEF DESCRIPTION OF THE DRAWINGS

These and further features and advantages of the present invention will be described below in connection with the accompanying drawings, in which.

DETAILED DESCRIPTION OF ILLUSTRATIVE EMBODIMENTS

Figure 7:
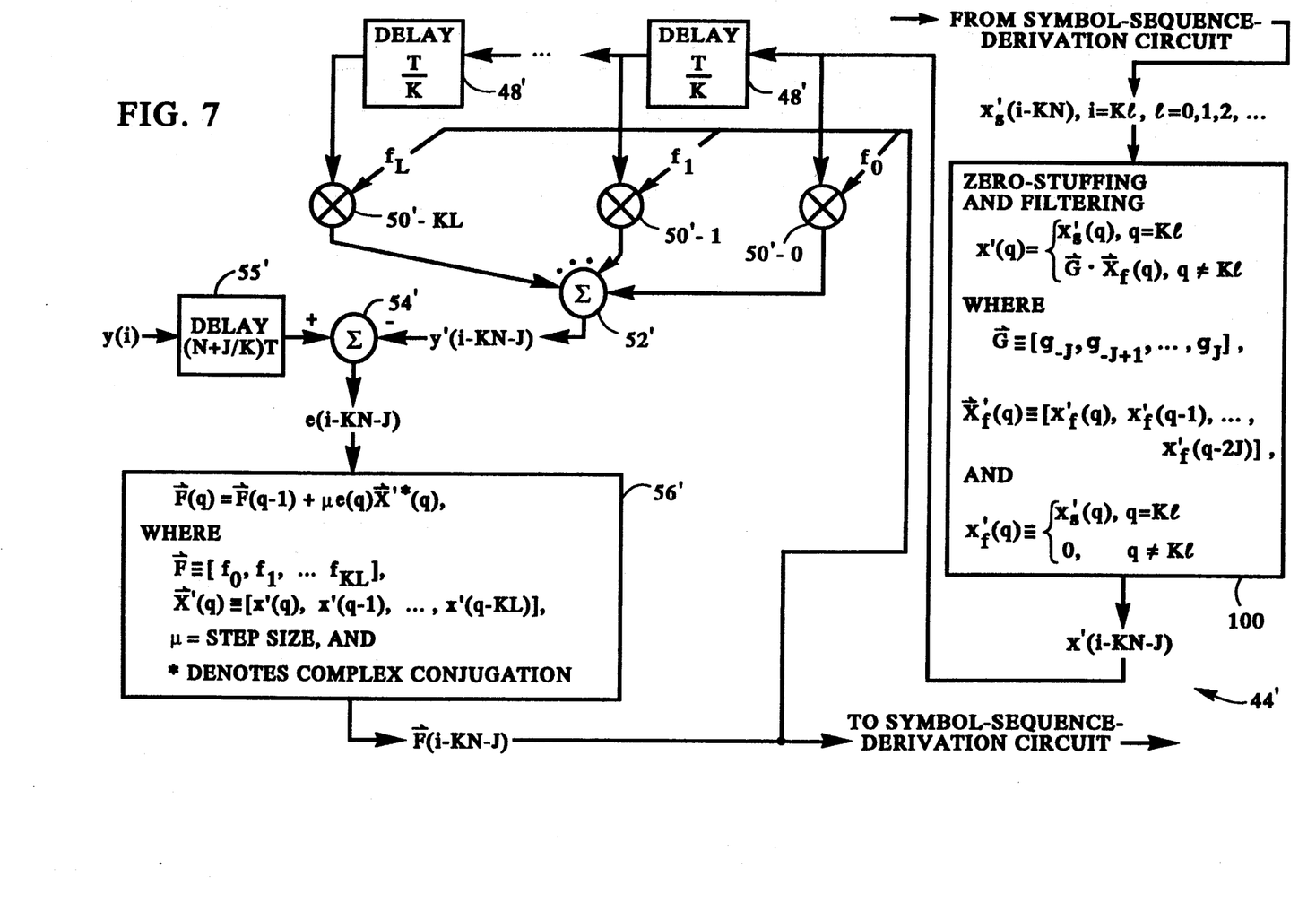
FIG. 7 is a block diagram of a channel-impulse-response estimator used in a fractionally spaced MLSE receiver of the type that employs the present invention.
Figure 8:
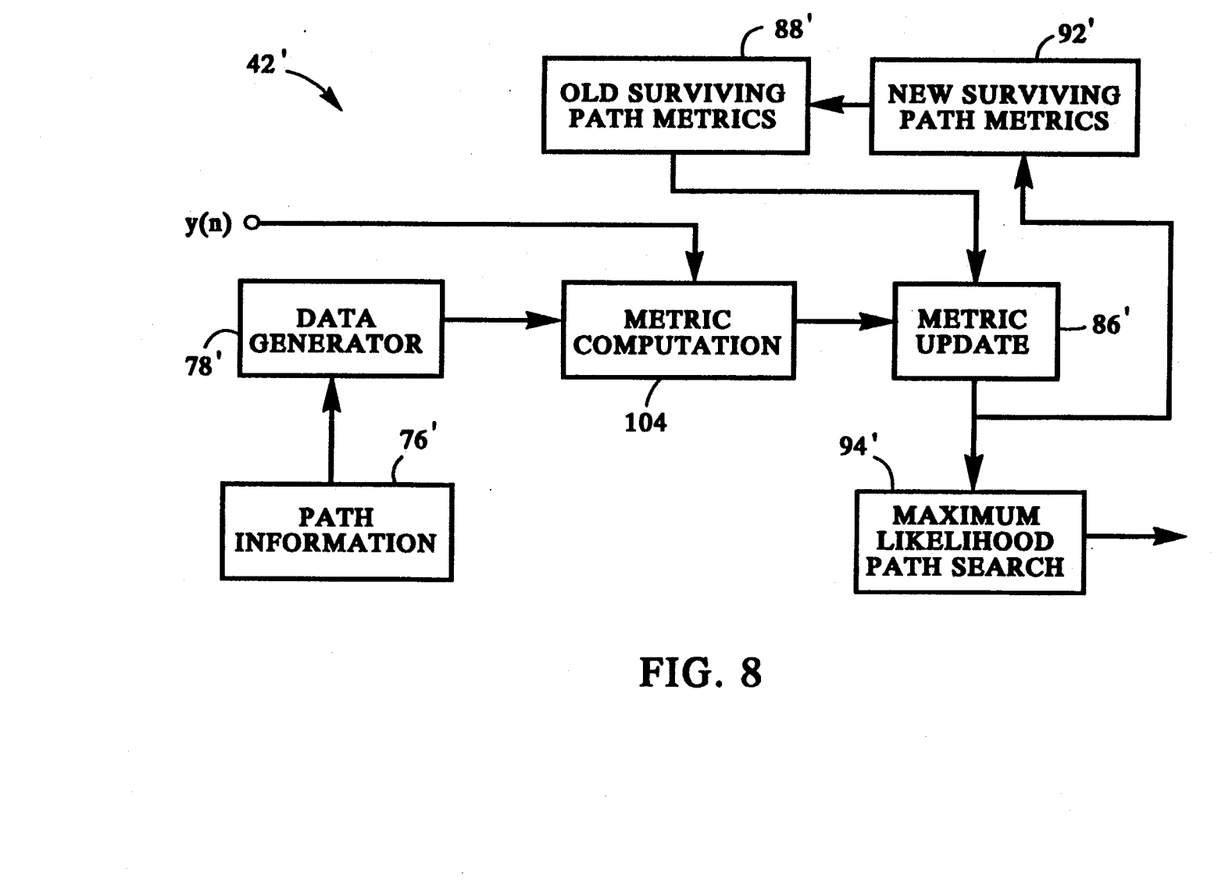
FIG. 8 is a block diagram of the symbol-sequence-derivation circuit of such a receiver.

FIGS. 7 and 8 are block diagrams, similar to FIGS. 4 and 6, that depict similar components of a maximum-likelihood-sequence estimator that embodies the present invention. The arrangement of FIGS. 7 and 8 differs from that of FIGS. 4 and 6 in that it is based on fractional spacing rather than on symbol spacing: the model that the symbol-sequence-derivation circuit uses takes inputs corresponding not only to symbol times but also to intermediate times between the symbol times. Moreover, whereas only a single new sample y(n) is used to calculate a branch metric in the arrangement of FIGS. 4 and 6, the branch metrics for the particular embodiment of FIGS. 7 and 8 are additionally based on values determined between the last symbol time and the current symbol time at K times the symbol frequency so that each branch metric is the sum of a plurality of differences computed for fractionally spaced samples.

The drawings reflect this difference by employing a sampling index i for the K/T sampling in FIGS. 7 and 8 instead of the sampling index n used in previous drawings for the 1/T sampling. Additionally, the number of delay elements in FIG. 7 is given as KL to show that K times as many are required for the same channel memory length L, where L is again given in symbol periods. The channel memory length does not have to be an integral number of symbol periods, however, so the L in FIG. 7 can be an integer times 1/K.

In order to perform the MLSE method in such a modified way, it is necessary to have channel parameters—i.e., filter coefficients—corresponding to successive filter delays of T/K. To produce such channel parameters, one of the impulse-response estimator's inputs must be samples that result from "oversampling" the receiver front-end signals. FIG. 7, in which elements are designated by primed versions of the reference numerals that designate corresponding elements in FIG. 4, depicts this difference by representing the input sample sequence as y(i), i.e., by using a new sampling index i.

Providing correspondingly timed values as the other input of estimator 44' requires interpolating between the symbols x' that the symbol-sequence-derivation circuit 42' (FIG. 8) produces only once every K sample times. FIG. 7 depicts one interpolation approach.

The manner in which this approach works can best be understood after considering an aspect of the operation of the device of FIGS. 1 through 6 whose discussion was previously omitted. It was stated in connection with that arrangement that the impulse-response estimator 44 modeled the effects of the time-varying part 32 of the channel. No mention was made of simulating the remainder of the channel, i.e., that part of the channel other than the time-varying part 32. The reason for this is that the remainder of the channel is so designed as to operate as a Nyquist filter; i.e., its output at symbol times, in the absence of noise and time-varying segment 32, would be the DQPSK-modulator output. When that part of the channel is considered only at symbol times, therefore, its effect can be ignored.

Since the device of the present invention samples between symbol times, however, the effects of that part of the channel cannot be ignored. An interpolator 100 therefore simulates this (known, time-invariant) part of the channel, in essence applying an oversampled version of the derived DQPSK output to a "filter" that simulates, in a non-adaptive manner, the stationary part of the channel.

In practice, this is achieved by computing the scalar product of two vectors $X_f$ and $G_f$. Vector $X_f$, as FIG. 7 indicates, is a segment of a sequence that consists of the symbol-value outputs of the symbol-derivation circuit 42' (FIG. 8) and K-1 zeros between each symbol-value output. Vector G consists of the coefficients of a transversal filter that models the invariant part of the channel. As a practical matter, G may be a truncated version of such a vector if a vector representing the entire delay of the stationary part of the channel would impose too great a delay for the application in question.

The resultant outputs x'(i-KN-J), where J is the delay of the interpolator, are applied to the channel-impulse-response estimator 44'. As FIG. 7 indicates, this estimator 44' adaptively models the effect of the time-varying part 32 of the channel in a manner similar to that in which the estimator 44 of FIG. 4 does, with the exception that the delays in the transversal filter are T/K rather than T. The resultant channel parameters F(i-KN-J) are applied to a symbol-sequence derivation circuit of the type depicted in FIG. 8, which is similar to that of FIG. 6 except that the weighting-function and difference elements 80 and 84 of FIG. 6 are replaced in FIG. 8 with a metric-computation block 104, which FIG. 9 depicts.

Figure 9:
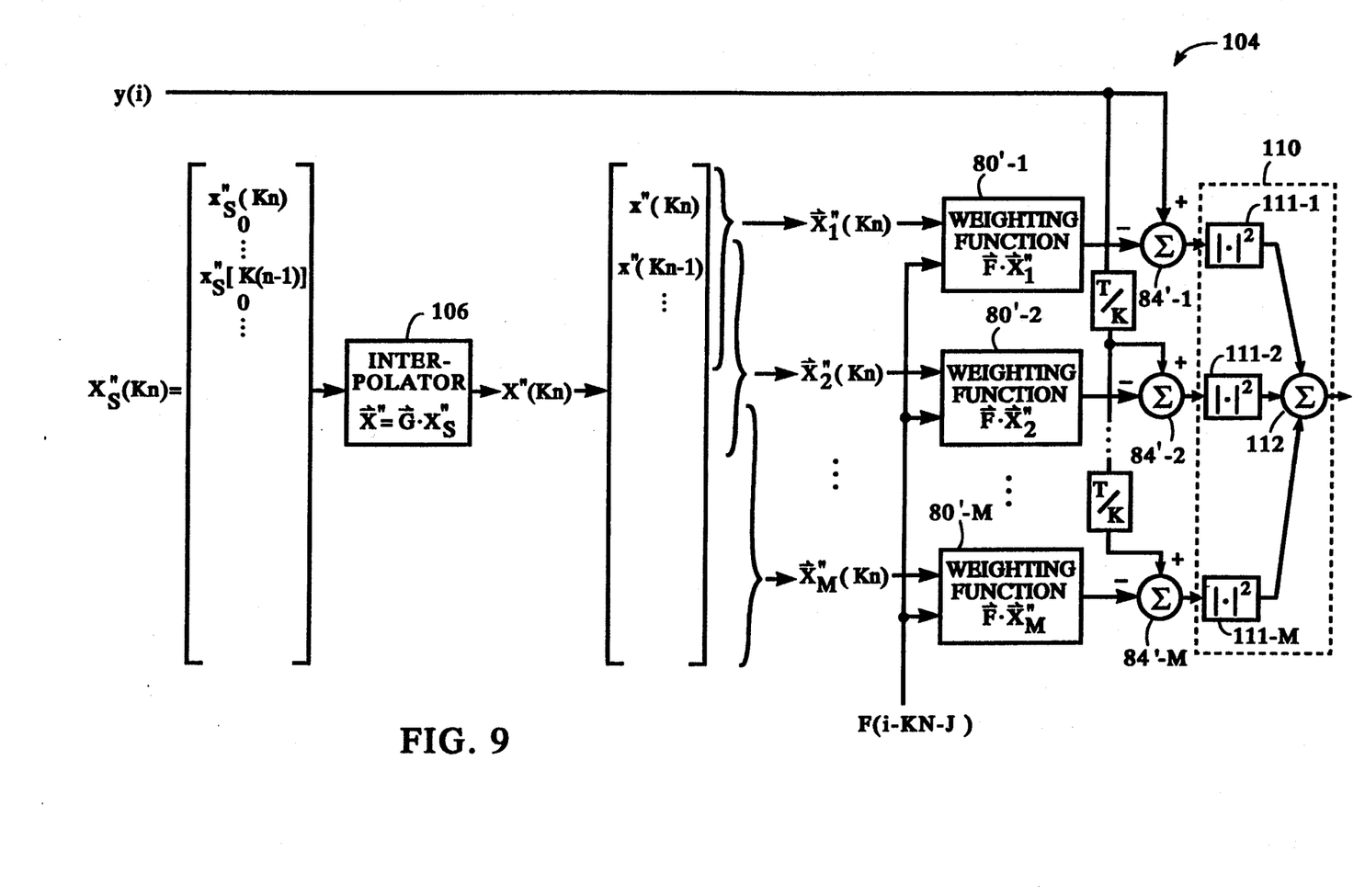
FIG. 9 is a more-detailed block diagram of the circuitry used by the symbol-sequence-derivation circuit of FIG. 8 to calculate branch metrics.

FIG. 9 depicts the output of the data generator 78' as candidate-symbol-sequence-representing vectors $X_s''$ essentially the same as the outputs $X''$ of data generator 78 of FIG. 6 with the exception that K-1 zeros are interposed between the conventionally produced symbol values. This zero stuffing is the same as the corresponding function performed by the interpolator 100 of FIG. 7. Interpolator 106 of FIG. 9 performs the remainder of the operation depicted in interpolator 100 of FIG. 7 and thereby produces a full oversampled output vector $X'''$.

Instead of performing a single scalar multiplication of a symbol sequence by the channel parameters to produce a branch metric, as the weighting-function element 80 of FIG. 6 does, the apparatus of FIG. 9 performs a plurality of weighting-function steps 80'-1 through 80'-M ($1 < M < K$), in which the channel-parameter vector F is multiplied by mutually shifted subvectors $X_1'', X_2'', \ldots, X_M''$ of the interpolator output $X'''$. Each of the resultant products is then subtracted by a respective subtraction circuit 84-1, ..., 84-M from a differently delayed version of the oversampled received signal y(i) to produce error components for respective samples, and a combiner 110 combines all error components by, for example, taking the sum of the squared magnitudes of the outputs of difference circuits 84' to produce a branch metric, as blocks 111-1, 111-2, 111-M, and 112 indicate. The remainder of the likelihood estimator then operates in a manner substantially the same as that described in connection with FIG. 4.

We have simulated a receiver of this type with $K=2$ based upon the time-division, multiple-access (TDMA) scheme proposed in IS-54, "Dual-Mode Mobile Station-Base Station Compatibility Standard," EIA/TIA PN2215, October 1990, with the slot format there described and fourteen symbols in each slot allocated both as a synchronization signal and as a training pattern for the channel estimator. Two-ray Raleigh-fading channel models in which two rays have independent fading characteristics, equal power, and a delay spread of 10.3 $\mu$sec., 20.6 $\mu$sec, and 41.2 $\mu$sec, corresponding to 0.25 T, 0.5 T, and T, respectively, were assumed for respective simulations. A Nyquist filter having a raised-cosine response with a rolloff factor of 0.35 to simulate the concatenation of the shaping filter in the transmitter and a matched filter in the receiver was used for interpolation. In the simulation, we truncated the filter impulse response in such a way that only the two odd coefficients, $g_1$ and $g_{-1}$, were used. Finally, a relative velocity between transmitter and receiver of 100 km/h and a signal-to-noise ratio of 18 dB were also used as simulation parameters.

The bit-error rate proved to be less than 3% at a delay spread of 0.25 T, as opposed to over 7% for symbol-spaced MLSE. For a delay spread of 0.5 T, the result was less than 2%, compared with over 5% for a symbol-spaced system. It was only for delay spread of exactly T (as one would expect) that a symbol-spaced version gave comparable results: the simulation showed just over a 2% bit-error rate for the fractionally-spaced receiver and a little less than a 3% bit-error rate for the symbol-spaced receiver.

The advantages of the present invention can, of course, be obtained in receivers that differ from the illustrated embodiment. A simpler version, for instance, could dispense with the filter function of interpolator 100, having it retain only the zero-stuffing function. Such an arrangement would also dispense with the interpolator 106 of FIG. 9. The result would be that the channel estimator 44' would act to simulate not only the time-varying part of the channel but also the remainder of the channel.

In one sense, this version has the virtue of simplicity. However, the "memory" of that part of the channel that the channel estimator simulates (and with which the symbol-sequence estimator must contend) would typically be many times as great, resulting in an exponential increase in computation intensity. Which of the two approaches is more desirable therefore depends on the relative memory lengths of the two channel components.

Other variations will also be apparent to those skilled in the art. For instance, although the drawings show a common version of the channel-parameter vector F being used for all of the weighting functions 80'-1 through 80'-M, our designs have included arrangements in which successive versions were used for the different weighting functions. For instance, F(i-KN-J) might be used for weighting function 80'-1, F(i-KNJ-1) might be used for weighting function 80'-2, and so forth.

It is thus apparent that the present invention not only yields results that are considerably better than those achievable with conventional MLSE systems but also can be practiced in a wide range of embodiments. It thus represents a significant advance in the art.

What is claimed is:

1. For recovering transmitted symbols from a received signal that results form transmission, through a channel characterized by multipath fading, of successive symbols spaced in time by a predetermined symbol period, a receiver comprising:
   A) a receiver front end for producing front-end samples from the received signal;
   B) a channel-impulse-response estimator for generating channel-model signals representing fractionally spaced channel-model parameters that define a channel model, for comparing the front-end samples with the response of the model to reference values, and for updating the channel-model parameters in response thereto; and
   C) a symbol-sequence-derivation circuit, responsive to the channel-model signals, for determining, for each of a plurality of candidate symbol sequences, an associated response of the model to an associated set of candidate inputs including not only an input corresponding to each symbol in the candidate sequence but also at least one intermediate input, for calculating metrics for candidate symbol sequences by comparing their associated model responses with the front-end samples, for determining, on the basis of the metrics thus calculated, which candidate sequence is most likely to have resulted in the front-end samples, and for generating a derived-symbol output indicative thereof.

2. A receiver as defined in claim 1 wherein the symbol-sequence-derivation circuit treats the channel-model parameters and the sets of candidate inputs as respective vectors and determines the responses of the model to the sets of candidate inputs by calculating the scalar products of the channel-model parameters and the sets of candidate inputs.

3. A receiver as defined in claim 1 wherein the symbol-sequence-derivation circuit calculates the metrics for candidate symbol sequences by summing the squares of the absolute values of the differences between front-end samples and corresponding responses of the model.

4. A receiver as defined in claim 1 wherein:
A) the receiver further includes an estimator intermediate-value interpolator, connected to receive the derived symbols, for interpolating estimator intermediate values therefrom and generating an estimator intermediate-value signal representative thereof; and
B) the channel-impulse-response estimator updates its channel-model parameters in response to the results of comparing the front-end samples with the response of the channel model to sequences not only of the derived symbols but also of the estimator intermediate values.

5. A receiver as defined in claim 1 wherein:
A) the symbol-sequence-derivation circuit includes a derivation-circuit intermediate-value interpolator for interpolating derivation-circuit intermediate values form the candidate sequences; and
B) the intermediate inputs in the sets of candidate inputs to which the symbol-sequence-derivation circuit determines the response of the model are the derivation-circuit intermediate values.

6. A receiver as defined in claim 1 wherein the receiver stores a predetermined training sequence and the impulse-response estimator includes the training sequence in its reference values.

7. A receiver as defined in claim 6 wherein the front-end samples that the receiver front-end produces include both symbol-time samples, which are produced at symbol times, separated by the symbol period, that correspond to the symbols to be recovered, and intermediate samples, which are produced at intermediate times between the symbol times.

8. A receiver as defined in claim 6 wherein the symbol-sequence-derivation circuit treats the channel-model parameters and the sets of candidate inputs as respective vectors and determines the responses of the model to the sets of candidate inputs by calculating the scalar products of the channel-model parameters and the sets of candidate inputs.

9. A receiver as defined in claim 6 wherein the symbol-sequence-derivation circuit calculates the metrics for candidate symbol sequences by summing the squares of the absolute values of the differences between front-end samples and corresponding responses of the model.

10. A receiver as defined in claim 6 wherein:
A) the receiver further includes an estimator intermediate-value interpolator, connected to receive the derived symbols, for interpolating estimator intermediate values therefrom and generating an estimator intermediate-value signal representative thereof; and
B) the channel-impulse-response estimator updates its channel-model parameters in response to the results of comparing the front-end samples with the response of the channel model to sequences not only of the derived symbols but also of the estimator intermediate values.

11. A receiver as defined in claim 6 wherein:
A) the symbol-sequence-derivation circuit includes a derivation-circuit intermediate-value interpolator for interpolating derivation-circuit intermediate values from the candidate sequences; and
B) the intermediate inputs in the sets of candidate inputs to which the symbol-sequence-derivation circuit determines the response of the model are the derivation-circuit intermediate values.

12. A receiver as defined in claim 6 wherein the channel-impulse-response estimator includes the derived symbols in its reference values.

13. A receiver as defined in claim 1 wherein the channel-impulse-response estimator includes the derived symbols in its reference values.

14. A receiver as defined in claim 13 wherein the receiver stores a predetermined training sequence and the impulse-response estimator includes the training sequence in its reference values.

15. A receiver as defined in claim 14 wherein the symbol-sequence-derivation circuit treats the channel-model parameters and the sets of candidate inputs as respective vectors and determines the responses of the model to the sets of candidate inputs by calculating the scalar products of the channel-model parameters and the sets of candidate inputs.

16. A receiver as defined in claim 11 wherein the symbol-sequence-derivation circuit calculates the metrics for candidate symbol sequences by summing the squares of the absolute values of the differences between front-end samples and corresponding response of the model.

17. A receiver as defined in claim 14 wherein:
A) the receiver further includes an estimator intermediate-value interpolator, connected to receive the derived symbols, for interpolating estimator intermediate values therefrom and generating an estimator intermediate-value signal representative thereof; and
B) the channel-impulse-response estimator updates its channel-model parameters in response to the results of comparing the front-end samples with the response of the channel model to sequences not only of the derived symbols but also of the estimator intermediate values.

18. A receiver as defined in claim 14 wherein:
A) the symbol-sequence-derivation-circuit includes a derivation-circuit intermediate-value interpolator for interpolating derivation-circuit intermediate values form the candidate sequences; and
B) the intermediate inputs in the sets of candidate inputs to which the symbol-sequence derivation circuit determines the response of the model are the derivation-circuit intermediate values.

19. A receiver as defined in claim 1 wherein the front-end samples that the receiver front end produces include both symbol-time samples, which are produced at symbol times, separated by the symbol period, that correspond to the symbols to be recovered, and intermediate samples, which are produced at intermediate times between the symbol times.

20. A receiver as defined in claim 19 wherein the symbol-sequence-derivation circuit calculates the metrics for candidate symbol sequences by calculating a branch metric for each symbol in he candidate sequences from a combination of the comparisons of both symbol-time and intermediate-time front-end samples with corresponding responses of the model.

21. A receiver as defined in claim 20 wherein:
A) the receiver further includes an estimator intermediate-value interpolator, connected to receive the derived symbols, for interpolating estimator intermediate values therefrom and generating an estimator intermediate-value signal, representative thereof; and B) the channel-impulse-response estimator updates its channel-model parameters in response to the results of comparing the front-end samples with the response of the channel model to sequences not only of the derived symbols but also of the estimator intermediate values.

22. A receiver as defined in claim 19 wherein the channel-impulse-response estimator updates the channel-model parameters by comparing both the symbol-time samples and the intermediate-time samples to the response of the model.

23. A receiver as defined in claim 22 wherein:
A) the symbol-sequence-derivation circuit includes a derivation-circuit intermediate-value interpolator for interpolating derivation-circuit intermediate values from the candidate sequences; and
B) the intermediate inputs in the sets of candidate inputs to which the symbol-sequence-derivation circuit determines the response of the model are the derivation-circuit intermediate values.

24. A receiver as defined in claim 14 wherein the front-end samples that the receiver front-end produces include both symbol-time samples, which are produced at symbol times, separated by the symbol period, that correspond to the symbols to be recovered, and intermediate samples, which are produced at intermediate times between the symbol times.

25. A symbol-communication system comprising:
A) a transmitter comprising:
i) a pulse-shaping filter for generating a baseband pulse-shaping-filter output by filtering symbols applied thereto at symbol times spaced by a predetermined symbol period; and
ii) means responsive to the pulse-shaping-filter output for generating a transmitter signal by modulating a carrier with the pulse-shaping-filter output and for applying the transmitter signal to a channel; and
B) a receiver comprising: p2 i) a receiver front end for receiving a receiver signal consisting of the response of the channel to the transmitter signal, the receiver front end including (a) means for deriving a receiver baseband signal from the receiver signal and (b) a matched filter that, when concatenated with the pulse-shaping filter, substantially forms a Nyquist filter therewith, for generating front-end samples by filtering the receiver baseband signal; and ii) a channel-impulse-response estimator for generating channel-model signals representing channel-model parameters that define a channel model, for comparing the front-end samples with the response of the model to reference values, and for updating the channel-model parameters in response thereto; and iii) a symbol-sequence-derivation circuit, responsive to the channel-model signals, for determining, for each of a plurality of candidate symbol sequences, an associated response of the model to an associated set of candidate inputs including not only an input corresponding to each symbol in the candidate sequence but also at least one intermediate input, for calculating metrics for candidate symbol sequences by comparing their associated model responses with the front-end samples, for determining, on the basis of the metrics thus calculated, which candidate sequence is most likely to have resulted in the front-end samples, and for generating a derived-symbol output indicative thereof.

26. A receiver as defined in claim 25 wherein:
A) the receiver further includes an estimator intermediate-value interpolator, connected to receive the derived symbols, for interpolating estimator intermediate values therefrom by computing the response of the Nyquist filter to the derived symbols and for generating an estimator intermediate-value signal representative thereof; and
B) the channel-impulse-response estimator updates its channel-model parameters in response to the results of comparing the front-end samples with the response of the channel model to sequences not only of the derived symbols but also of the estimator intermediate values.

27. A receiver as defined in claim 25 wherein:
A) the symbol-sequence-derivation circuit includes a derivation-circuit intermediate-value interpolator for interpolating derivation-circuit intermediate values form the candidate sequences by computing the responses of the Nyquist filter to the candidate sequences; and
B) the intermediate inputs in the sets of candidate inputs to which the symbol-sequence-derivation circuit determines the response of the model are the derivation-circuit intermediate values.

* * * * *